Nov. 10, 1959

V. P. MAGNUSON ET AL 2,912,160

GRAPH PLOTTER

Filed Sept. 10, 1952

INVENTOR.
VERNON P. MAGNUSON
GLENN E. HAGEN
BY CHARLES R. WILLIAMS

Herbert E Metcalf
ATTORNEY

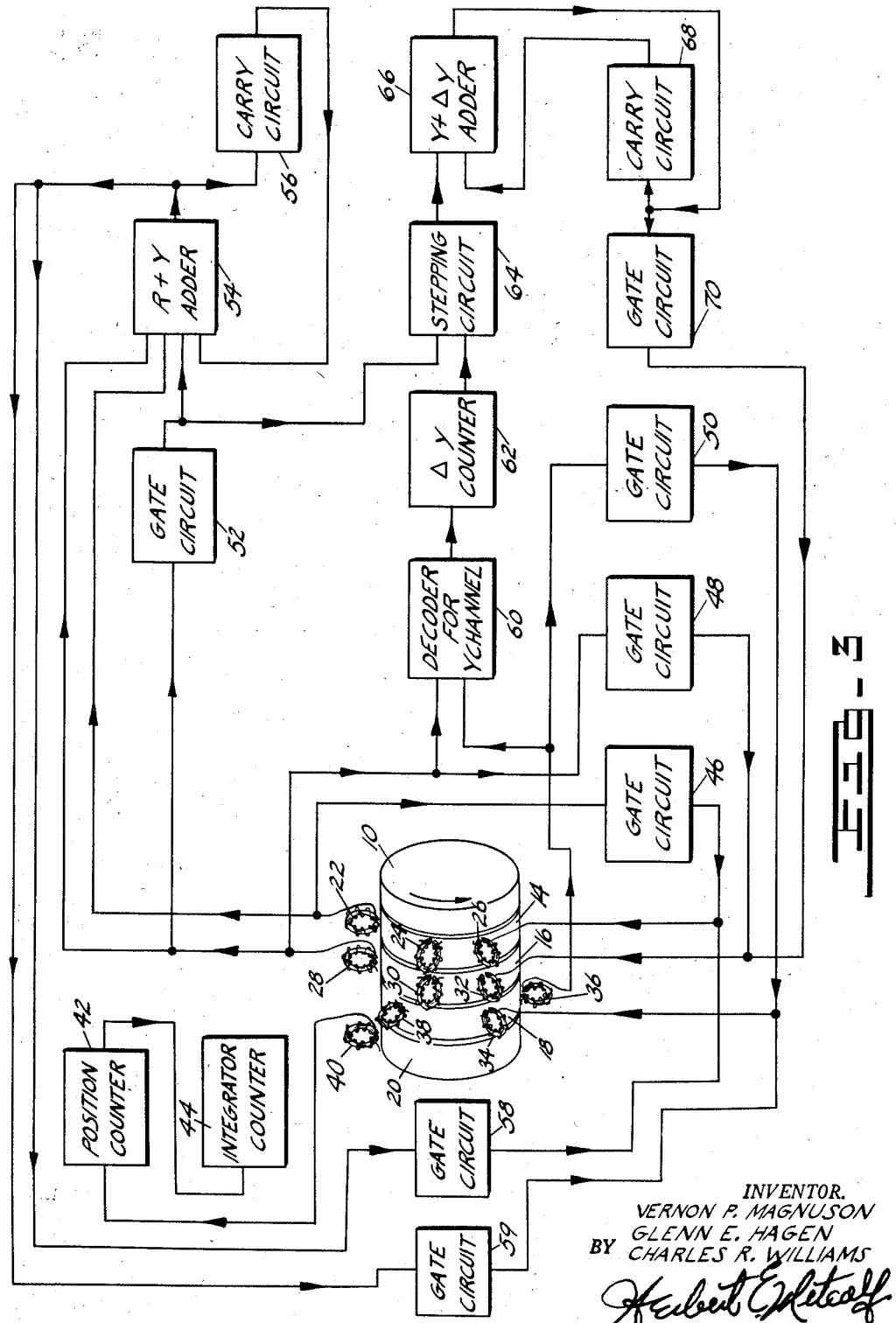

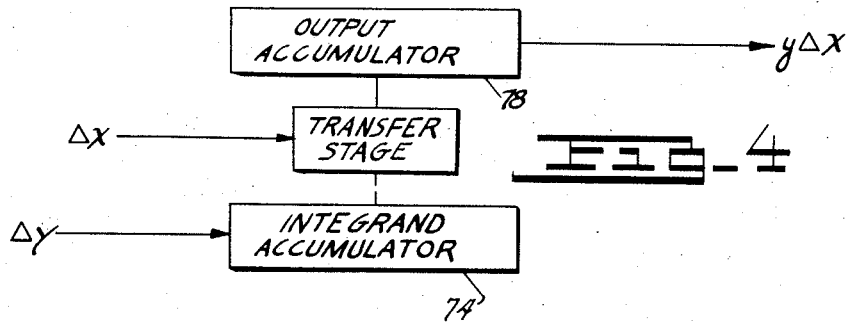
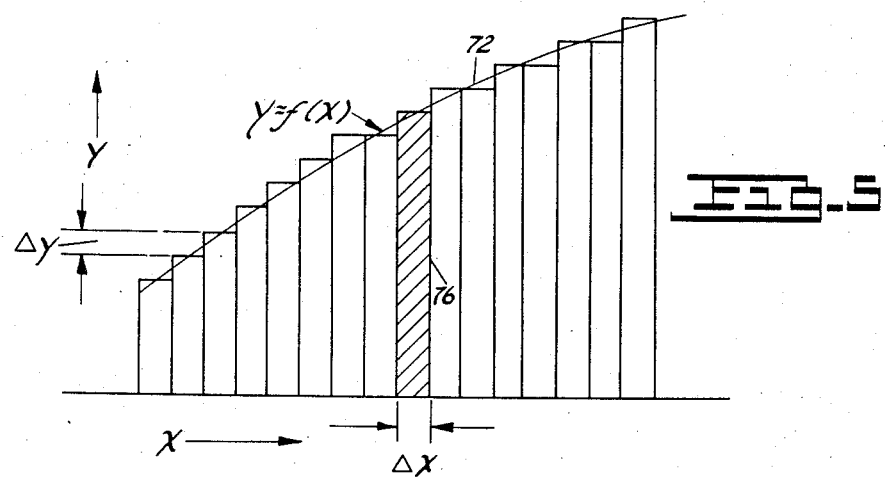
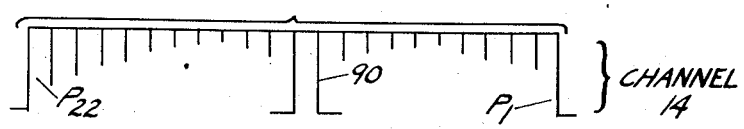
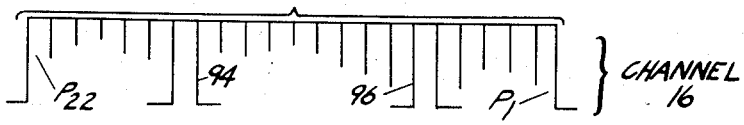
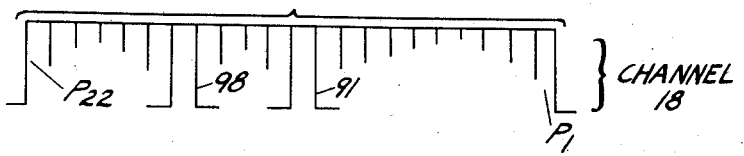
INVENTOR.
VERNON P. MAGNSON
GLENN E. HAGEN
CHARLES R. WILLIAMS
BY
ATTORNEY

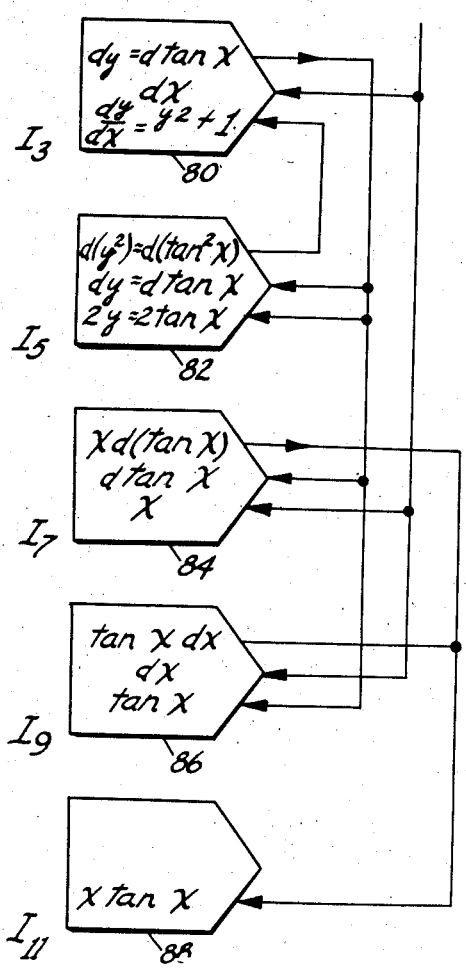

ered in the solution of a differential equation.
United States Patent Office 2,912,160
Patented Nov. 10, 1959

2,912,160

GRAPH PLOTTER

Vernon P. Magnuson, Gardena, Glenn E. Hagen, Manhattan Beach, and Charles R. Williams, Palos Verdes, Calif., assignors to Northrop Corporation, a corporation of California Application September 10, 1952, Serial No. 308,758

14 Claims. (Cl. 235—58)

This invention relates to a graph plotter and more particularly to apparatus for plotting a graph of the relationship between a pair of quantities that are being computed in a digital differential analyzer.

In co-pending application Serial No. 217,478 filed March 26, 1951, now Patent No. 2,900,134, by Floyd G. Steele and William F. Collison, a digital differential analyzer is disclosed for solving complex differential equations by digital steps. The analyzer has the advantages of the digital computer, in that it solves mathematical problems with a relatively great speed and accuracy. The analyzer also has the advantages of a differential machine in that it solves mathematical problems with a minimum number of components. The number of components are further reduced because of the logical system of component operation which has been incorporated into the machine. Because of the above advantages, the analyzer requires less space to solve complex differential equations than the space that is occupied by a desk of normal size.

Frequently, in solving a differential equation, it is necessary to solve a number of interrelated subsidiary equations. For example, even the solution of a simple differential equation like $$\frac{d^2y}{dx^2} = -y$$

requires the use of three interrelated differential equations to obtain the result that $y = \sin x$. These interrelated equations obtain the values of $$\frac{d^2y}{dx^2}, \frac{dy}{dx} \text{ and } y$$

at any instant. Very often it is desired to obtain a visual indication of the relationship between certain quantities generated in the solution of the different equations. Until now, no apparatus has existed for obtaining such an indication.

This invention provides apparatus for operating in conjunction with a digital differential analyzer to plot a graph of the relationship between any pair of quantities generated in the solution of a differential equation. For example, in the solution of the equation $$\frac{d^2y}{dx^2} = -y$$

the apparatus may plot a curve illustrating the relationship between $$\frac{d^2y}{dx^2} \text{ and } y$$

at any instant to provide a visual indication of the solution desired. The apparatus may also plot a curve illustrating the relationship between $$\frac{d^2y}{dx^2} \text{ and } \frac{dy}{dx}$$

or the relationship between $$\frac{dy}{dx} \text{ and } y$$

if such curves should be desired.

An object of this invention is to provide a graph plotter for operating in conjunction with a digital differential analyzer to plot a curve illustrating the relationship at any instant between a pair of quantities gen- Another object is to provide apparatus for determining the relationship between a pair of quantities generated in the solution of a differential equation and for providing a visual indication at any instant of this relationship.

A further object is to provide apparatus of the above character for adding increments and decrements of a generated quantity with due account for their signs and for providing a visual indication of the resultant quantity at any instant.

Still another object is to provide apparatus for plotting a curve of the resultant value at any instant of a first quantity in relationship to the resultant value of a second quantity at that instant.

Other objects and advantages will be apparent from a detailed description of the invention and from the appended drawings and claims.

In the drawings:

Figure 3 is a schematic diagram, partly in block form and partly in perspective, of a digital differential analyzer intended for use in conjunction with the graph plotter shown in Figures 1 and 2;

Figure 4 is a block diagram illustrating the operation of one of the integrators forming a part of the digital differential analyzer shown in Figure 3;

Figure 5 is a curve further illustrating the operation of the integrator shown in Figure 4;

Figure 6 is a chart which illustrates how different parts of an integrator are coded to control the operation of the integrator;

Figure 7 is a schematic diagram illustrating the relationship between different integrators forming the differential digital analyzer shown in Figure 3 when the analyzer is solving a particular problem; and Figure 8 is a chart illustrating the operation of certain of the components shown in Figure 3.

Figure 1:
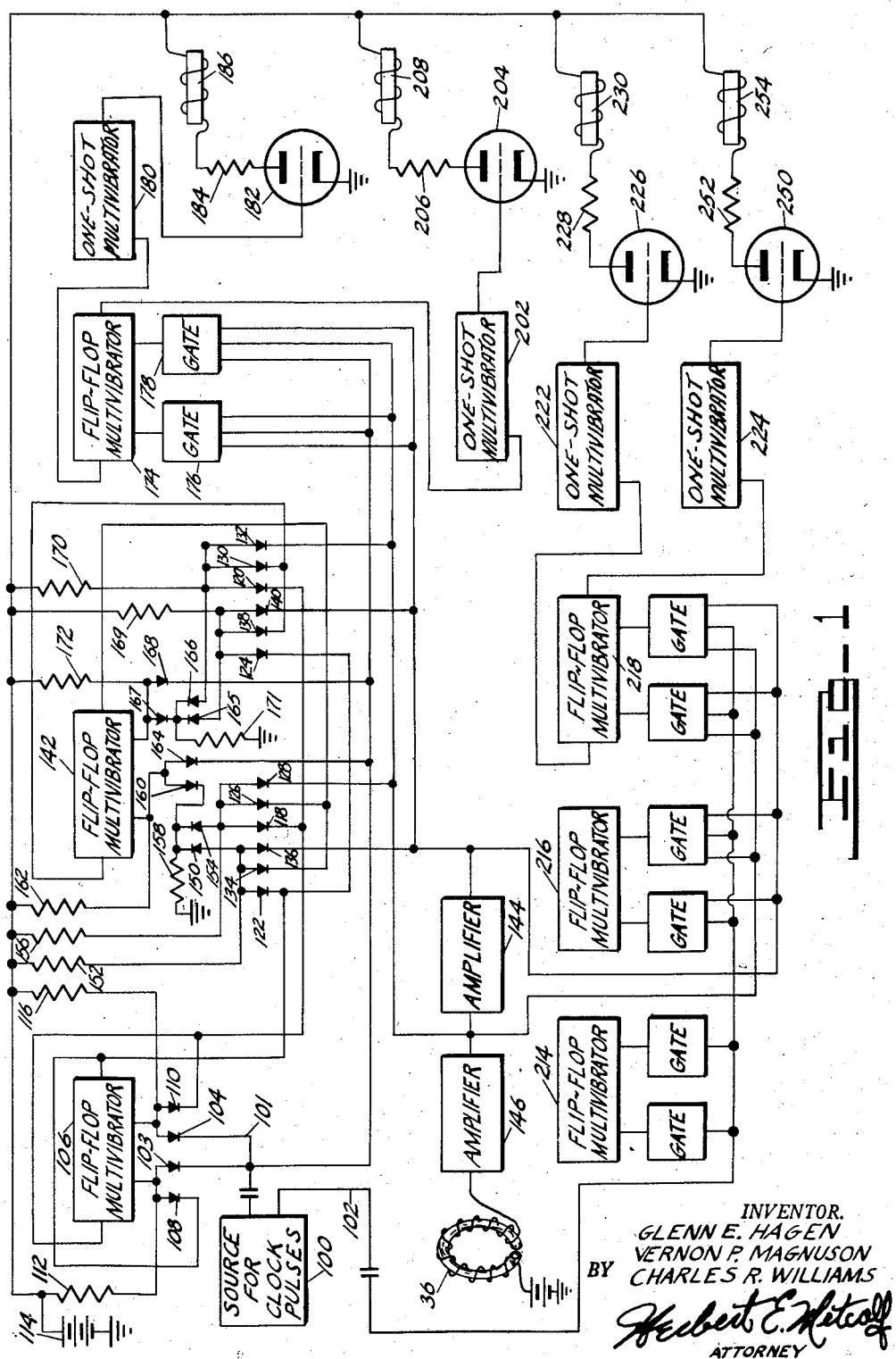
Figure 1 is a circuit diagram, partly in block form, of certain electrical features constituting in part one embodiment of the invention.

The digital differential analyzer shown in Figure 3 is adapted to operate in conjunction with the graph plotter constituting this invention. The analyzer includes a drum 10 adapted to be rotated by a suitable motor (not shown). A plurality of channels 14, 16, 18 and 20 are provided on the periphery of the drum in spaced relationship to one another. Each of the channels is formed from a thin layer of a magnetic material, such as an iron oxide compound, which is uniformly coated on the drum. The circumferential distance of each channel may be considered as being divided into a plurality of equally spaced portions which are sufficiently separated from one another to receive a different polarity of magnetization relative to the magnetic polarities applied to adjacent portions. For example, each of the channels 14, 16, 18 and 20 may be considered as being divided into approximately 1,160 equally spaced portions or positions when the drum has a radius of approximately 4 inches.

A plurality of toroidal coils is positioned contiguous to each of the channels 14, 16, 18 and 20. For example, toroidal coils 22, 24 and 26 are positioned contiguous to the channel 14. The coils 22 and 26 are separated from each other by approximately 104 pulse positions, and the coil 24 is disposed between the coils 22 and 26. As will be disclosed in detail hereafter, the coil 22 is adapted to pick up the magnetic pattern provided on the different positions of the channel 14 as the drum rotates and to provide signals in accordance with this magnetic pattern. The coil 24 is adapted to produce a continuous magnetic signal for erasing the magnetic pattern previously disposed on the drum, and the coil 26 is adapted to produce the new magnetic pattern on the drum after the previous pattern has been erased.

Similarly, toroidal coils 28, 30 and 32 are positioned in juxtaposition to the channel 16. The coils 28, 30 and 32 are disposed in substantially the same relationship to one another as the coils 22, 24 and 26 and are adapted to perform the same functions as the coils 22, 24 and 26, respectively. Coils 34, 36 and 38 are also provided in contiguous relationship to the channel 18. The coil 34 is adapted to record a magnetic pattern on the channel 18, and the coil 36 is adapted to produce electrical signals in accordance with this pattern. The coil 38 erases the magnetic pattern previously generated on channel 18 by the coil 34. The coils 34 and 36 are effectively separated from each other by approximately 49 pulse positions while the digital differential analyzer is operating to solve a problem. Only a single coil 40 is positioned in juxtaposition to the channel 20, and this coil is adapted to produce a positive electrical signal in each pulse position in accordance with a magnetic pattern permanently provided on the channel.

Counters 42 and 44 are associated with the pick-up coil 40. The counter 42 is adapted to provide a count between "0" and "48" and is adapted to return to "0" upon each count of "48" and every multiple thereof. The counter 44 is connected to the counter 42 to provide an increment in count every time that the counter 42 has received a full count of "48." The range of the counter 44 is between "0" and "22." In this way, the magnetic drum is divided into 22 integrator storage sections each having 48 pulse positions. Each integrator storage section comprises all the necessary storage capacity for an integrator as described hereinafter with reference to Figure 4.

A gate 46 is connected between the pick-up coil 22 and the record coil 26 in the channel 14 to record back on the channel the magnetic pattern provided in certain pulse positions of each integrator. Similarly, gates 48 and 50 are connected between the coils 28 and 32 in the channel 16 and between the coils 34 and 36 in the channel 18, respectively to record back on their respective channels the magnetic patterns provided in certain positions of each integrator. As will be disclosed in detail hereinafter, the signals passing through the gates 46 and 48 are permanently recorded on the channels for a particular problem to control the operation of the digital differential analyzer during the solution of the problem.

In addition to being connected to the gate circuit 48, the coil 28 is also connected to the input terminal of a gate circuit 52 having its output terminal connected to an input terminal of an adder 54. Connections are directly made to input terminals of the adder 54 from the coils 22 and 28 and from a carry circuit 56. The output from the adder 54 controls the operation of the carry circuit 56 and the operation of a gate circuit 58, the output terminal of which is connected to the coil 26. The output from the adder 54 also controls the operation of a gate circuit 59, the output from which is introduced to the coil 34.

The outputs from the coil 28 and the coil 36 are introduced to input terminals of a decoder 60 which controls the operation of a counter 62. Connections are made from the output of the counter 62 and from the output of the gate circuit 52 to a stepping circuit 64 which has its output terminal connected to an adder 66. The output from the adder 66 is applied to the input terminal of a carry circuit 68 having its output terminal connected to an input terminal of the adder 66. The output terminal of the adder 66 is also connected to a gate circuit 70 having its output terminal connected to the coil 32.

It is well known that a function $y=f(x)$ may be represented by a curve having the independent quantity $x$ plotted along the abscissa and the dependent quantity $y$ plotted along the ordinate. It is also well known that the integral $\int f(x)$ may be represented by the area under the curve. For example, the integral of a curve 72 in Figure 5 may be represented by the area under the curve.

If infinitesimal increments of $x$ are obtained, these increments may be prepresented by the symbol $\Delta x$. If the value of $y$ is determined for the beginning of each increment $\Delta x$, the area under the curve $y=f(x)$ along each increment $\Delta x$ may be approximated by the product $y\Delta x$. The approximation can be as close as desired by making the increment $\Delta x$ very small. If all of the incremental areas of $y\Delta x$ are added together, a resultant value is obtained which is a close approximation of the complete area under the curve $y=f(x)$.

Each of the 22 integrators in the digital differential analyzer disclosed in co-pending application Serial No. 217,478, now Patent No. 2,900,134, obtains a close approximation of the area under a curve $y=f(x)$ by gradually varying the value of $x$ by equal increments of $\Delta x$. Every time that the value of $x$ for a particular integrator, such as the integrator shown in Figure 4 is varied by an increment of $\Delta x$, the value of $y$ which has accumulated in an integrand accumulator 74 is combined with the increment $\Delta x$. The combination $y\Delta x$ causes an incremental area to be obtained which is represented by the rectangle 76 in Figure 5. This incremental area is introduced to an output accumulator 78 for addition with all of the previous increments of area. In this way, the output accumulator 78 combines all of the increments of the area to provide a resultant indication of the area under the complete curve $y=f(x)$.

As will be seen in Figure 5, the value of $y$ may have to change upon each increment of $\Delta x$ in order to follow the curve $y=f(x)$. Changes in the value of $y$ stored in the accumulator 74 are obtained by combining increments of $\Delta y$ with the value of $y$. The increments of $\Delta y$ for a particular integrator, such as the integrator shown in Figure 4, may be obtained from the values stored in the output accumulators of other integrators as well as from the output of the particular integrator itself.

The interrelationship between the integrand accumulator 74 of a particular integrator and the output accumulators of other integrators is illustrated in Figure 7 for the solution of the problem $$\frac{d^2y}{dx^2}=y^2+1$$

As is mathematically known, the differential solution of this problem indicates that $y=x\tan x$. As may be seen in Figure 7, the solution of the above problem may be obtained by a plurality of integrators indicated by blocks 80, 82, 84, 86 and 88. Each integrator has at least three connections made to it. A connection is made to the middle portion of the block representing an integrator to provide an input for the independent quantity $x$ for the integrator. A connection is made to the bottom portion of the block representing the integrator to provide an input for the dependent quantity $y$ for the integrator. A line also extends from the top portion of the appropriate block to provide an output from the integrator represented by the block to the inputs of other integrators.

For example, variations in the independent quantity $x$ for the integrator 84 in Figure 7 are obtained from the output terminal of the integrator 80. This interrelationship between the integrators 80 and 84 indicates that in the solution of differential problems, the independent quantity $x$ for a particular integrator may be varied in accordance with variations in the output quantity from another integrator. Furthermore, in Figure 7 the independent quantity $y$ for the integrator 82 is varied in accordance with variations in the output quantity from the integrator 80. This interconnection illustrates that the value of $y$ for a particular integrator may be varied by the output obtained from another or a plurality of other integrators.

The values of the independent quantity $x$, the dependent quantity $y$ and the output quantity for each integrator are actually obtained by the utilization of certain pulse positions on the channels 14, 16 and 18 (Figure 3). As has been disclosed previously, 1,160 pulse positions are provided on each of the channels 14, 16 and 18. In the channels 14 and 16, these positions are divided into 22 integrators each having 48 pulse positions so that a total of 1,056 positions are utilized in this manner.

The remaining 104 positions in the channels 14 and 16 are represented by the separation between the pick-up heads 22 and 28 and the record heads 26 and 32, respectively. These positions are repeatedly utilized as the coils 24 and 30 erase the information on the drum after the information has moved past the coils 22 and 28 and has been converted by the coils 22 and 28 into signals for utilization by the digital differential analyzer. The 104 positions constituting the idle portions of the channels 14 and 16 are constantly shifted in position as the drum 10 rotates because of the recordation of information on each pulse position by the coils 26 and 32.

The 48 positions constituting each integrator in the channel 16 are subdivided so that approximately 22 positions in the last portion of each integrator indicate the value of $y$ for the integrator and the first 22 positions provide a pattern which controls the incremental changes in the value of $y$. Specifically, the pulse positions between the 25th and 46th positions indicate the value of $y$ for the integrator by the binary code. By this code, the least significant digit for the value of $y$ in each integrator is indicated by the magnetic level in the 25th position.

Since the least significant position indicates a value of either "0" or "1," a magnetic pulse having a relatively high level may be provided to indicate the value "0." Similarly, the 26th position may indicate a value of "2" by a magnetic pulse having a relatively high value and a value of "0" by a magnetic pulse having a relatively low level. Values of "4" or "0" may be indicated in the 27th position by a high or low level of magnetization in a manner similar to that disclosed above. Each of the successive positions may indicate by a high level of magnetization a number which is twice as great as the number indicated in the previous position. By placing the proper level of magnetization in each pulse position, a composite indication may be provided in the binary form of any decimal number.

All of the positions in the channel 16 between the 25th and 46th positions for each integrator are utilized only when a relatively high value of $y$ is stored in the integrator. Generally some of the storage capacity for an integrator is not utilized to allow for increments in the value of $y$ as the computation proceeds. When the storage capacity of an integrator is not utilized fully for the dependent quantity $y$, indications are not provided in the channel 16 in the positions adjacent to the 47th position for the integrator. However, binary indications may subsequently be provided in some of these positions as the value of $y$ for the integrator increases during computation.

The value of $y$ is so placed in the channel 16 in the 25th to 46th positions for each integrator that the digital indications never overflow. Because of this, all of the pulse positions adjacent the 46th position for each integrator in the $y$ channel are generally not completely utilized.

The sign of $y$ for each integrator is indicated by the presence or absence of a pulse in the channel 16 in the 47th position for the integrator. A pulse in the channel 16 in the 47th position for the integrator indicates that the value of $y$ for the integrator is positive, and the absence of a pulse in that position indicates that the value of $y$ for the integrator is negative.

Just as the channel 16 stores the value of $y$ for each integrator in the 25th to 46th positions of each integrator, the channel 14 stores the value of $y\Delta x$ for each integrator in corresponding positions in the channel. The value of $y\Delta x$ is stored in the binary code in a manner similar to that disclosed above for the value of $y$. However, the value of $y\Delta x$ for each integrator in the channel 14 is so scaled that binary indications may at times be provided in all of the pulse positions adjacent the 47th position for the integrator.

When the value of $y\Delta x$ for a particular integrator exceeds the value that may be recorded in binary form in the channel 14 for the integrator, the integrator is said to overflow. Upon an overflow, the indications of $y\Delta x$ in the channel 14 for the integrator return to a relatively low value. For example, if the integrator can store a number in the channel 14 up to a value equivalent to the decimal number 576, an overflow would occur when a value of $+5$ for $\Delta y$ is added to an indication of 573 already in the channel 14 for the integrator. The value of $y\Delta x$ stored in the channel 14 for the integrator would then be $+2$. Because of the overflow in the value of $y\Delta x$ stored in the channel 14 for the integrator, a magnetic pulse is produced at the 48th pulse position for the integrator and is recorded in the channel 18 to indicate the overflow. This magnetic pulse is recorded in a particular pulse position in the channel 18 to indicate that the value of $y\Delta x$ has occurred in a particular one of the integrators.

Since variations in the values of $y$ and $y\Delta x$ for each integrator occur only upon each increment of the independent quantity $\Delta x$ for the integrator, the increments of $\Delta x$ are provided for each of the 22 integrators in sequence. The sequential variation of the independent quantity for each integrator by increments of $\Delta x$ is obtained as the drum 10 rotates. The increment of $\Delta x$ for each integrator is represented by a magnetic pulse which is placed in the channel 14 in one of the first 22 positions for each integrator.

Since each of the 22 positions in the channel 14 for a particular integrator corresponds to a different one of the 22 integrators, the magnetic pulse is placed in a particular pulse position corresponding to the integrator from which the increment of $\Delta x$ is obtained. For example, in the solution of the differential equation represented by the interrelationship between the integrators shown in Figure 7, a magnetic pulse would be placed in the channel 14 in a particular one of the 22 coding positions for the integrator 82 corresponding to the time at which the output indication from the integrator 80 produces a corresponding signal in the coil 36. Such a pulse is illustrated at 90 in Figure 6.

If the magnetic pulse provided in one of the first 22 positions in the channel 14 for a particular integrator coincides in time with a positive pulse in the channel 18, $\Delta x$ is positive. For example $\Delta x$ for the integrator 82 would be positive when an output pulse appears in the channel 18 to indicate an overflow of the output quantity in the integrator 80 at the same time that the coding pulse for the integrator appears in the channel 14. The overflow indication from the integrator 80 controls the sign of $\Delta x$ for the integrator 82 because of the interrelationship between the integrators shown in Figure 7. Such an overflow pulse in the channel 18 is illustrated at 91 in Figure 6. However, the value of $\Delta x$ for the integrator 82 would be negative if a positive pulse did not appear in the channel 18 for the integrator 80 at the same time as the coding pulse in the channel 14.

Every time that an increment of $\Delta x$ is obtained for a particular integrator, the gate circuit 52 is opened upon the occurrence of the first pulse in the channel 16 between the 25th and 46th positions for the integrator. When the gate circuit 52 is opened, it prepares the adder 54 for operation. The adder 54 then arithmetically combines the indications of the dependent quantity $y$ in the channel 16 for the particular integrator with the indications of the output quantity $y\Delta x$ in the channel 14 for the same integrator. The $y$ number is added to the output quantity of $\Delta x$ is positive and is subtracted from the output quantity if $\Delta x$ is negative.

When $\Delta x$ is negative, subtraction of the value of $y$ from the value of $y\Delta x$ in the channel 14 in effect causes the negative value of $\Delta x$ to be transferred to $y$ so that $(y)(-\Delta x)$ becomes $(-y)(\Delta x)$. Subtraction of the value of $y$ is accomplished by reversing the indication of $y$ in each pulse position and by adding a value of $+1$ to the least significant digit indicating the value of $y$. For example, an indication of 101 representing a value of $+5$ is converted into an indication of 011 representing a value of $-5$ by reversing the indication 101 into an indication of 010 and by adding a 1 to the least significant digit. In the above example, the least significant digit is at the extreme right and the significance advances with digital movements to the left.

Not only the value of $y$ but the sign of $y$ is complemented when $\Delta x$ is negative. This is accomplished by placing a pulse in the channel 16 in the 47th position for a particular integrator upon the previous absence of a pulse in this position or by eliminating any pulse previously placed in the position. Although an indication of 011 represents a negative value of $-5$ when no pulse appears in the 47th pulse position, it would also represent a positive value of $+3$ when a pulse appears in the 47th position. Since 5 is the octal complement of 3, it may be seen from the above example and from other examples that the conversion of a positive number into a negative number is obtained by producing the octal complement of the number and by changing in the 47th position the indication of the sign. Because of the fact that subtracting 5 from a number is equivalent to adding 3 in the octal system, the conversion of a value of $y$ into its complementary value provides the correct result when the number is arithmetically combined with the value of $y\Delta x$.

The arithmetical combination of the dependent and output quantities for a particular integrator takes place sequentially on a step by step basis for each of the pulse positions between the 25th and 47th positions for the integrator. Thus, the indications in the first pulse positions of the channels 14 and 16 after the opening of the gate circuit 52 would be first arithmetically combined. The indications in the second pulse positions of the channels 14 and 16 after the opening of the gate circuit 52 would next be combined, and the indications in the third pulse positions would subsequently be combined.

The carry circuit 56 carries an indication from a first pulse position to the next position if a full count occurs upon the addition of the indications in the first position. For example, if the dependent quantity $y$ and the output quantity $y\Delta x$ both have high levels of magnetization in the 28th position, the addition of these quantities in the 28th position would cause a $+1$ to be added to a $+1$ to give a resultant quantity of $+2$. Since $+2$ for any position is equivalent in the binary system to 0 with a carry to the next highest digit, the resultant indication provided by the adder 54 would be a "0" for the 28th position. However, a $+1$ would be carried into the 29th position for addition with the indications of the dependent and output quantities in the 29th position.

In this way, a signal is provided by the adder 54 for each pulse position after a proper combination of the dependent, output and carry quantities for the position. The indication for each position provided by the adder 54 passes through the gate circuit 58 for recordation by the coil 26 in the channel 14. The indications recorded by the coil 26 for a particular integrator serve as the output quantity $y\Delta x$ for the integrator upon the next increment in $\Delta x$ for the integrator.

As previously disclosed, as positive increments of $y\Delta x$ for a particular integrator are added to the indications already in the channel 14 for the integrator, the indications in the channel 14 for the integrator approach saturation. Such a saturation is indicated by a positive pulse in each of the pulse positions representing the value of $y\Delta x$ for the integrator. The subsequent addition of positive increments of $y\Delta x$ for the integrator causes a pulse to be produced in the channel 18 at the 48th position for the integrator and the indications in the channel 14 to return to a relatively low value. In this way, the production of a pulse in the channel 18 at the 48th position for an integrator indicates a positive overflow in the value of $y\Delta x$ for the integrator.

Just as a pulse is produced in the channel 18 at a time corresponding to the 48th position for a particular integrator to indicate a positive overflow in the channel 14 for the integrator, a lack of a pulse at this time indicates a negative overflow for the integrator. The absence of a pulse provides an indication of a negative overflow because of the complementation provided in the channel 14 for negative values. This complementation is similar to that provided in the channel 16 for the value of $y$. As disclosed previously, this complementation causes a full negative indication in the channel 14 to be indicated by a 0 in each pulse position. A 0 is provided in each pulse position to indicate a full negative value since a full positive value is indicated by a 1 in each pulse position and is converted into an indication of a 0 in each pulse position when the number is complemented.

When a pulse is produced in the channel 18 at a time corresponding to the 48th pulse position for a particular integrator, it passes through the gate circuit 59. The gate circuit 59 is opened only at the 48th pulse position for each integrator because of the particular connections made to it. The pulse passing through the gate circuit 59 is recorded by the coil 34 in the channel 18. In like manner, the coil 34 provides a recordation in the channel 18 of any overflow in the channel 14 for each of the 22 integrators in the analyzer.

As previously disclosed, the coils 34 and 36 are effectively separated from each other by 49 pulse positions. Since the length of each integrator is only 48 positions, a precessing action occurs in the channel 18. This precessing action causes a pulse position to be made available in the channel 18 so that the overflow indication in the channel 18 in the 48th pulse position for each integrator can be recorded after the computation has been made for the integrator. This may be seen in the chart shown in Figure 8.

In all of the vertical columns in the chart shown in Figure 8 except for the two at the extreme right, numbers between "1" and "22" are shown corresponding to the 22 integrators in the digital differential analyzer. In the two vertical columns at the extreme right, numbers are shown prefaced with the letters "I" and "P." The letter "I" followed by a number indicates the particular integrator that is moving past the coil 34 at any instant. For example, "$I_3$" indicates that a pulse position in the third integrator is moving past the coil 34. Similarly, a designation such as "P₁₃" indicates that the thirteenth pulse position in the particular integrator is moving past the coil 34.

As will be seen at 92 in Figure 8, a first indication is provided at the 48th position of integrator "1" to indicate a positive or negative overflow in the cumulative value of $y\Delta x$. This indication advances from the coil 34 towards the coil 36 as the drum 10 rotates through the 48 positions of integrator "2." At the 48th position of integrator "2," an indication is recorded by the coil 34 to indicate any overflow from the integrator "2" and is shown at 93 in Figure 8. At the $P_1I_3$ position, the indication 92 passes through the gate circuit 50 to the coil 34 and is again recorded in the channel 18, this time at the pulse position adjacent to the indication 93.

Similarly, indications are provided in adjacent pulse positions to show whether or not an overflow has occurred in the cumulative value of $y\Delta x$ for each of the other integrators in the analyzer. These indications are recirculated by the gate circuit 50 which remains open during the first 47 positions of each integrator. At the 48th pulse position for each integrator, the gate circuit 50 closes and prevents any recirculation of old information. At the same time as the gate circuit 10 closes, the overflow indication for the integrator moving past the coil 34 is recorded in the channel 18.

After the indications have been provided in the channel 18 at the 48th pulse position for each integrator, integrator "1" becomes available for computation a second time. As the drum rotates through the first 22 positions for the integrator, the output indications for the 22 integrators move in sequence past the coil 36. This causes the output indications to become available for determining the sign of the increment of $\Delta x$ for the integrator, as disclosed previously, and for determining the sign of each increment of $\Delta y$ for the integrator, as will be disclosed in detail hereinafter. In like manner, the output at the 48th position of the 22 integrators is made available to each of the other integrators as it is presented for computation.

Just as the increment of $\Delta x$ for each integrator is determined by a coincidence between magnetic pulses in the channels 14 and 18, increments of $\Delta y$ are determined by a coincidence of magnetic pulses in the channels 16 and 18. For each integrator, pulses are provided in the channel 16 in certain of the first 22 positions for the integrator to indicate which of the other integrators are to control the changes in the value of $y$. For example, pulses controlling the increments of $\Delta y$ for an integrator are illustrated at 94 and 96 in Figure 6. Pulses are provided in particular ones of the first 22 positions for each integrator because of the relationship between the 22 integrators in the digital differential analyzer and the first 22 positions in the channel 16 for each integrator. For example, in the solution of the problem represented by the integrator relationship shown in Figure 7, a magnetic pulse would be placed in the channel 16 in a certain one of the first 22 positions for the integrator 82 corresponding to the time at which an output signal is obtained from the integrator 80.

The sign of $\Delta y$ is determined in a similar manner to the sign of $\Delta x$. $\Delta y$ for a particular integrator is positive if the coil 36 picks up a positive pulse in the channel 18 at the same time that the coil 28 picks up a coding pulse in the channel 16. For example, a positive pulse appears in the channel 18 at 98 in Figure 6 at the same time as the pulse 94 in the channel 16. $\Delta y$ is negative for a particular integrator when a positive pulse does not occur in the channel 18 at the same time as a pulse in the channel 16 in one of the first 22 positions of the integrator. Thus, $\Delta y$ for the pulse 96 in the channel 16 is negative since a pulse does not appear at the same time in the channel 18.

Because of the interrelationships between the different integrators in the solution of a problem, a number of increments of $\Delta y$ can be obtained for a particular integrator every time that the integrator is presented for computation. A number of increments can occur in $\Delta y$ even though only one increment can occur in $\Delta x$ when the integrator becomes available for computation. This may be seen from Figure 6 where only the $\Delta x$ pulse illustrated at 90 is provided as a code in the channel 14 in the first 22 positions for a particular integrator, but a pair of pulses 94 and 96 are provided as a code in the channel 16.

Some of the increments of $\Delta y$ for a particular integrator may be positive at the same time that other increments for the integrator are negative. After the decoder 60 has operated on the code pulses in the channels 16 and 18 to determine whether the various increments of $\Delta y$ for a particular integrator are positive or negative, the counter 62 determines the resultant value of all the increments. For example, if four increments of positive value and two increments of negative value occur during one cycle of computation for a particular integrator, the counter 62 determines that the resultant increment for that cycle of computation is +2. The counter also converts the resultant indication into a binary form corresponding to the binary indications of $y$ in the channel 16 and of $y\Delta x$ in the channel 14.

Upon the operation of the gate circuit 52, the stepping circuit 64 is opened for the passage into the adder 66 of the binary indications of the resultant value of $\Delta y$ for a particular integrator. The stepping circuit 64 controls the passage of the binary indications of $\Delta y$ so that the indication in each pulse position passes into the adder 66 at the same time as the indication in the corresponding position of the dependent quantity $y$.

The carry circuit 68 operates in a manner similar to the carry circuit 56. It carries over a digital indication from one pulse position to the next position when a full count is obtained in the first pulse position by the addition of the different digital indications. The resultant indication in each pulse position of the new value of $y$ passes through the gate circuit 70 for recordation in the channel 16 by the coil 32.

The new value of $y$ is then arithmetically combined with the next increment of $\Delta x$, and the resultant increment of $y\Delta x$ is combined with the new value just recorded in the channel 14. In this way, a plurality of computations may be provided on an incremental basis for each integrator to obtain the correct solution of a mathematical problem.

During the time that the coils 22 and 28 in the channels 14 and 16, respectively, pick up pulses in the first 22 positions of each integrator, the gate circuits 46 and 48 are opened. Opening of the gate circuits during these periods causes the pulses in the first 22 positions to be recorded by the coils 26 and 32 back on the channels 14 and 16, respectively. In this way, the pulses in the first 22 positions are permanently maintained on the channels 14 and 16 during the solution of a particular problem so as to provide a coding pattern controlling the interrelationship between the different integrators in the digital differential analyzer.

Figure 2:
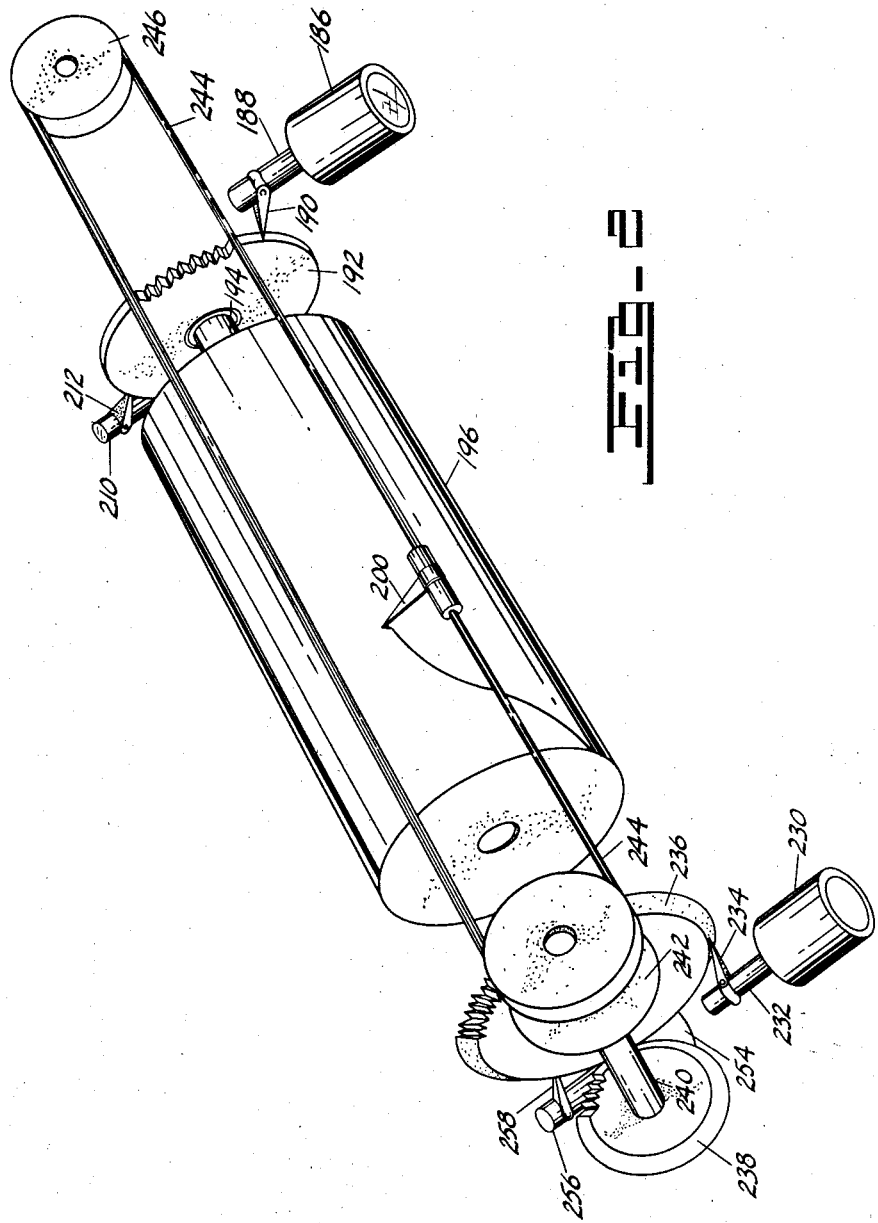
Figure 2 is an enlarged perspective view in simplified form of certain mechanical features adapted to be operated in conjunction with the electrical features shown in Figure 1 to form a complete embodiment of the invention.

The graph plotter shown in Figures 1 and 2 is adapted to operate in conjunction with the digital differential analyzer disclosed above to plot curves of quantities being computed in the analyzer. The graph plotter includes a source 100 connected to the counters 42 and 44 (Figure 3) to pass a positive pulse every time that a particular pulse position in an integrator is reached. For example, the source 100 may be so connected to the counters 42 to pass through a line 101 a positive pulse on the 48th pulse position of a particular integrator. The source 100 may also be connected to pass through a line 102 a positive pulse on the 48th pulse position of a second integrator. As will be later explained in detail, the variation of a quantity involved in one integration (from one integrator) will be plotted against the variation of a quantity involved in another integration (from another integrator). Therefore, a need exists for the pulse source 100 to receive and deliver two different pulse chains which will individually time-select the occurrence of quantities from two different integrators, e.g., the overflow pulses in the quantity $y\Delta x$. The pulses on the line 101 select one integrator and the pulses on the line 102 select another. The manner in which the source of pulses 100 is connected to the position counter 42 and the integrator counter 44, will, of course, depend upon the particular integrators to be observed and plotted.

The output on the line 101 is introduced to the cathodes of diodes 103 and 104, the plates of which are respectively connected to the grids of the left and right tubes in a flip-flop multivibrator 106 and to the plates of diodes 108 and 110, respectively. Connections are also made from the plates of the diodes 103 and 108 to a resistance 112 in series with a suitable direct power supply, such as a battery 114, and from the plates of the diodes 104 and 110 to a resistance 116 in series with the battery 114. The cathode of the diode 108 is connected to the plate of the right tube in the multivibrator 106, and the cathode of the diode 110 is similarly connected to the plate of the left multivibrator tube.

In addition to being connected to the diodes 110 and 108, the plates of the left and right tubes in the multivibrator 106 are connected to diodes 118 and 120 and to diodes 122 and 124, respectively. Diodes 126 and 128 are associated with the diode 118 to form a first diode network, and diodes 130 and 132 are similarly associated with the diode 120 to form a second network. The diodes 122 and 124 are associated with diodes 134 and 136 and with diodes 138 and 140 in third and fourth networks, respectively. The diode networks control the operation of a flip-flop multivibrator 142.

Connections are made from the plate of the left tube in the multivibrator 142 to the diodes 130 and 138 and from the plate of the right tube in the multivibrator to the diodes 126 and 134. The diodes 136 and 140 have pulses of voltage applied to them from an amplifier 144, and the diodes 128 and 132 have voltage pulses applied to them from an amplifier 146. The signal inverting amplifiers 144 and 146 are connected in cascade arrangement with the coil 36 also shown in Figure 3.

The plates of the diodes 122, 134 and 136 are connected to the plate of a diode 150 and through a resistance 152 to the battery 114. Similarly, the plates of the diodes 118, 126 and 128 are connected to the plate of a diode 154 and through a resistance 156 to the battery 114. The cathodes of the diodes 150 and 154 are connected to a grounded resistance 158 and to the cathode of a diode 160.

Connections are made from the plate of the diode 160 to a resistance 162 in series with the battery 114 and to the plate of a diode 164 having its cathode connected through the line 101 to the source 100. The plates of the diodes 160 and 164 are also connected to the grid of the left tube in the multivibrator 142. In like manner, diodes 165, 166, 167 and 168 are associated with the grid of the right tube in the multivibrator 142 in an arrangement similar to that provided by the diodes 150, 154, 160 and 164 for the left multivibrator tube. Resistances 169, 170, 171 and 172 corresponding to the resistances 152, 156, 158 and 162 are also associated with the grid of the right tube in the multivibrator 142.

A flip-flop multivibrator 174 is associated with the multivibrators 106 and 142. Gate circuits formed by diode networks similar to those disclosed above control the introduction of triggering signals through the grids of the two tubes of the multivibrator 174. These gate circuits are indicated in block form at 176 and 178 and are shown as receiving some of the necessary input signals including signals from the source 100 and the amplifiers 140 and 146. The construction of the gate circuits 176 and 178 is similar to that disclosed in co-pending application Serial No. 217,478 filed March 26, 1951, now Patent No. 2,900,134, by Floyd G. Steele and William F. Collison and is especially shown in Figures 29 and 33 of the patent reference.

The plate of the left tube in the flip-flop multivibrator 174 is connected to the grid of the left tube in a one shot multivibrator 180 having the plate of its right tube connected to the grid of a tube 182. The cathode of the tube 182 is grounded, and the plate is in series with a resistance 184, a solenoid 186 and the battery 114. The solenoid 186 is provided with an armature 188 (Figure 2) which controls the movement of a pawl 190. The pawl 190 is adapted to engage the teeth of a gear 192 mounted on a shaft 194. A drum 196 is also mounted on the shaft 194 for controlled rotation with the gear 192 when the gear is actuated by the pawl 190. A stylus 200 is provided in contiguous relationship with the drum 196 to record the movements of the drum.

Similarly, the grid of the left tube in a one-shot multivibrator 202 (Figure 1) is connected to the plate of the right tube in the multivibrator 174. The plate of the right tube in the multivibrator 202 is in turn connected to the grid of a tube 204 having a grounded cathode. A resistance 206 and a solenoid 208 are provided in series between the plate of the tube 204 and the positive terminal of the battery 114. An armature 210 (Figure 2) is associated with the solenoid 208 and is adapted to control the operation of a pawl 212. The pawl 212 in turn engages the teeth of the gear 192 to produce a movement of the gear in an opposite direction to that produced by the pawl 190.

Flip-flop multivibrators 214, 216 and 218 (Figure 1) are provided in an arrangement similar to that provided for the multivibrators 106, 142 and 174. However, pulses are introduced to the gate circuits associated with the flip-flops through a line 102 from the source 100 instead of through the line 101. Connections are made from the plates of the left and right tubes in the multivibrator 218 to one-shot multivibrators 222 and 224 corresponding to the multivibrators 180 and 202, respectively. A tube 226, a resistance 228 and a solenoid 230 are associated with the multivibrator 222 in an arrangement similar to that disclosed above. An armature 232 (Figure 2) is adapted to be actuated by the solenoid 230 so as to control the movement of a pawl 234.

The pawl 234 engages the teeth of a gear 236 in mesh with a bevel gear 238. The bevel gear 238 is mounted on a shaft 240 which also carries a pulley 242. A rope 244 extends in a closed loop around the pulley 242 and around a pulley 246 laterally displaced from the pulley 242. The stylus 200 is mounted on the rope 244 for lateral movement relative to the drum as the gear 236 is driven by the pawl 234.

Similarly, a tube 250 (Figure 1), a resistance 252 and a solenoid 254 are associated with the one-shot multivibrator 224 in an arrangement corresponding to that produced by the tube 226, the resistance 228 and the solenoid 230. The solenoid 254 is adapted when energized to actuate an armature 256 controlling the movement of a pawl 258. The pawl 258 engages the teeth of the gear 236 to produce a rotation of the gear in a direction opposite to that produced by the pawl 234.

As previously disclosed, the source 100 is adapted to produce in the line 101 a pulse at the 48th pulse position of a first integrator and to produce in the line 102 a pulse at the 48th position of a second integrator. The connections in the source 100 for producing such pulses may be easily determined from the disclosure of the digital differential analyzer provided in co-pending application Serial No. 217,478 filed March 26, 1951, by Floyd G. Steele and William F. Collison, now Patent No. 2,900,134. Of course one manner in which the signals in lines 101 and 102 may be formed is to apply a pulse indicative of the 48th pulse position from the pulse position counter to a well-known "and" gate logic element, as disclosed herein, with a pulse indicative of a particular integrator. The output from such a gate circuit will consist of a pulse during the 48th pulse position of a particular selected integrator. Of course separate gate circuits would be employed for the lines 101 and 102.

Upon the production of a positive pulse in the line 101, the voltage on the cathodes of the diodes 103 and 104 become positive with respect to the voltage on the plate of the diode. The voltage on the cathode of the diode 110 is also more positive than the voltage on the plate of the diode when the left tube in the multivibrator is cut off and the right tube in the multivibrator is conducting. Because of the voltage relationships in the diodes 104 and 110, current cannot flow from the battery 114 through the resistance 116 and the diodes. This causes the voltage on the grid of the right tube in the multivibrator 106 to rise.

At the end of the pulse from the source 100, the voltage on the cathode of the diode 104 falls below the voltage on the diode plate, and current flows through a circuit including the battery 114, the resistance 116 and the diode 104. The resultant voltage drop across the resistance 116 causes the voltage on the grid of the right tube in the multivibrator 106 to fall and the tube to become cut off.

When the right tube in the multivibrator 106 becomes cut off, a relatively high voltage is produced on its plate and is introduced to the cathode of the diode 108 to prevent any current from flowing through the diode. Upon the introduction of the next positive pulse through the line 101, the diode 103 also becomes cut off and prevents current from flowing through the resistance 112. The resultant rise in the voltage on the grid of the left tube in the multivibrator 106 continues until the end of the pulse from the source 100. At the end of the pulse from the source 100, current flows through the resistance 112 and the diode 103 and produces a negative pulse of voltage on the grid of the left tube in the multivibrator 106 so as to cut off the tube.

In this way, the left and right tubes in the multivibrator 106 become cut off upon the introduction of alternate clock signals from the source 100. Because of the alternate nonconductance of the two tubes in the multivibrator 106, the multivibrator provides an indication of whether the total count of pulses is odd or even. For example, if the right tube is conducting for a count of "0," the count would become even every time that the right tube subsequently becomes conductive.

For a count of "0," the left tube in the multivibrator 142 can be considered as cut off as well as the left tube in the multivibrator 106. When the left tube in the multivibrator 142 is cut off, the plate of the tube and the cathodes of the diodes 130 and 138 have relatively high voltages. Relatively high voltages are also produced on the cathode of the diode 124 every time that the right tube in the multivibrator 106 is cut off to indicate an odd count. Since the diodes 124 and 138 form a network with the diode 140 and since the diodes 124 and 138 are cut off, current will not flow through the resistance 169 when the diode 140 becomes cut off.

The diode 140 becomes cut off upon the production of a positive pulse by the coil 36 to indicate an overflow in the storage of $y\Delta x$ for a particular integrator in the channel 16. Upon the cut-off of the diode 140 and the diodes 124 and 138, the voltage on the plate of the diode 165 becomes relatively high and causes current to flow through a circuit including the battery 114, the resistance 169, the diode 165 and the resistance 171. The positive voltage produced across the resistance 171 by the flow of current through the resistance is applied to the cathode of the diode 167 at the same time that a positive pulse of voltage is applied to the cathode of the diode 168 from the source 100. When these voltage relationships occur, the flow of current through the resistance 172 becomes interrupted, thereby causing the voltage on the grid of the left tube in the multivibrator 142 to remain high.

At the end of the pulse from the source 100, current again flows through the resistance 172 and the diode 168 and produces across the resistance a voltage drop which causes the voltage on the grid of the right tube in the multivibrator 142 to fall. This causes the right tube in the multivibrator 142 to be triggered into a state of nonconductivity. Similarly, the left tube in the multivibrator 142 is triggered into a condition of nonconductivity when the voltages on the plates of the right tubes in the multivibrators 106 and 142 are relatively high and when pulses of voltage are applied to the diodes 136 and 164 from the amplifier 144 and the source 100, respectively.

In addition to providing a positive count of signals from the coil 36, the multivibrator 142 is also responsive to a negative count. The absence of a positive pulse from the coil 36 is indicative of a negative count which is registered by cutting off the right tube in the multivibrator 142 effectively subtracting one from the value registered in the flip-flop multivibrators. That is, negative count is produced when a signal is not picked up by the coil 36 at the same time that a positive pulse from the source 100 passes through the line 101. When a positive pulse is not picked up by the coil 36 in a particular pulse position, the relatively low voltage from the coil is inverted by the amplifier 146 for the production of a positive pulse by the amplifier. This positive pulse is introduced to the diodes 128 and 132 to be counted. The operation of the gate circuits, 176, 178, those containing diodes 103 and 104, and those including diodes 128 and 132, is conditioned upon the pulses on the line 101 which are present only during the 48th pulse of a particular integrator. Therefore, the plotted values comprise the value of a selected integrator which are manifested by counting an excess of a predetermined number of digits to control a graph plotter.

Upon the introduction of a pulse from the amplifier 146 to the diode 132, the right tube in the multivibrator 142 is triggered into a state of non-conductivity provided that the voltages on the cathodes of the diodes 120, 130 and 168 are also relatively high. These voltages are high when the voltages on the plates of the left tubes in the multivibrators 106 and 142 are relatively high and when a positive pulse is simultaneously introduced from the source 100. In like manner, the left tube in the multivibrator 142 becomes non-conductive when pulses are simultaneously applied from the source 100 and the amplifier 146 and the left tube in the multivibrator 106 and the right tube in the multivibrator 142 are also cut off. In this way, the multivibrators 106 and 142 count positive and negative pulse indications in the channel 18.

As disclosed above, the right tubes in both of the multivibrators 106 and 142 are cut off to indicate a positive count of 4 pulses. When both the right tubes in the multivibrators 106 and 142 are cut off, and the gate circuit 178 has passed a signal to cut off the right tube in the multivibrator 174. The resultant high voltage on the plate of the right tube in the multivibrator 174 causes the left tube in the monostable multivibrator 202 to become conductive for a relatively short period of time which is dependent upon the circuit parameters provided in the multivibrator. During the time that the left tube in the multivibrator 202 is conducting, the right tube in the multivibrator 202 is cut off and a relatively high voltage is produced on its plate. That is, the change in voltage at the plate of the right tube in the multivibrator 174 is applied to pulse the multivibrator 202 and cause a pulse to appear at the plate of the right tube in the multivibrator 202. The high voltage on the plate of the right tube in the multivibrator 202 causes the tube 204 to become conductive.

Current then flows through a circuit including the battery 114, the solenoid 208, the resistance 206 and the tube 204 and energizes the solenoid. When the solenoid 208 is energized, it actuates the armature 210, and the armature 210 in turn moves the pawl 212 in a direction to produce a rotation of the gear 192 through an arc equivalent to one gear tooth. The gear 192 then drives the drum 196 through a similar arc relative to the stylus 200. Since the stylus presses against the drum, it provides an indication of the rotary movement of the drum. As a result, the existence of a predetermined number of counts, which indicate values provided from particular integrators is plotted as an accumulated quantity. Of course, output quantities from two separate integrators are plotted with respect to each other in the described embodiment.

In like manner, the left tubes in both of the flip-flops 106 and 142 are cut off for a negative count of —4. When the left tubes in both of the multivibrators 106 and 142 are cut off, the gate circuit 176 opens and passes a pulse to cut off the left tube in the multivibrator 174. The resultant high voltage on the plate of the left tube in the multivibrator 174 causes the left tube in the monostable multivibrator 180 to start conducting and the right tube to become cut off for a relatively short period of time. During this period of time, the voltage on the plate of the right tube in the multivibrator 180 becomes relatively high. The high voltage on the plate of the right tube in the multivibrator 180 causes the tube 182 to become conductive and current to flow through a circuit including the battery 114, the solenoid 186, the resistance 184 and the tube 182.

When current flows through the solenoid 186, the solenoid actuates the pawl 190 (Figure 2) to produce a rotary movement of the gear 192 through an arc equivalent to one tooth on the gear. This rotary movement is in a direction opposite to that produced on the gear 192 by the pawl 212. Because of the opposite movements provided on the gear 192 and the drum 196 by the pawls 190 and 212, the gear 192 and the drum 196 always rotate through an angle indicative of the count of output pulses from a particular integrator.

In like manner, a pulse is produced by the source 100 in line 102 at the 48th position of a second integrator every time that the integrator is made available for computation whereby to accumulate a value from the second integrator and control the solenoids 230 and 254 to thus position of the stylus 200. This clock pulse is introduced from the source 100 through the line 102 to the flip-flop multivibrators 214, 216 and 218. If an output pulse is produced by the coil 36 at the same time as the clock pulse from the source 100, the multivibrators 214, 216, and 218 indicate a positive increase of one integer in the count. However, the multivibrators indicate a decrease of one integer in the count of pulses when a positive pulse is not picked up by the coil 36 at the same time as the passage of a clock pulse through the line 102. The count is therefore registered by the multivibrators until the accumulated count is at a value to trigger the one-shot multivibrator 180 (upon the occurrence of a high voltage at the plate of the left tube of the multivibrator 174 as described above) and displace the stylus to indicate a different cumulative value. Thus the quantities of two integrators are plotted, one with respect to the other, to form a plot indicative of the computation. Of course, the significance of the plot will depend upon the program at the digital differential analyzer. A more complete knowledge of such programs is afforded by the above-referenced patent documents.

Every time that a positive count of +4 has been made by the multivibrators 214 and 215, the right tube in the multivibrator 218 is cut off in a manner similar to that disclosed above and a relatively high voltage is produced on its plate. This relatively high voltage causes the solenoid 254 to be energized and the pawl 258 (Figure 2) to be actuated. When the pawl 258 is actuated, it produces a rotary movement of the gear 236 through an arc equivalent to one tooth on the gear. The gear 236 then produces a corresponding rotation of the bevel gear 238 and of the pulley 242. The pulley 242 in turn produces a corresponding displacement of the rope 244 and of the stylus 200 secured to the rope.

Similarly, the rope 244 and the stylus 200 are displaced in an opposite direction when the solenoid 230 is energized by a full count of —4 in the multivibrators 214 and 216. In this way, the stylus is laterally displaced relative to the drum through a distance dependent upon the count of output pulses in the channel 18 for the second integrator.

Since a relative displacement between the drum 196 and the stylus 200 is produced in two substantially perpendicular directions to indicate the output provided by two different integrators, the stylus plots a curve on the drum of the relationship between these outputs. By controlling the timing of pulses from the source 100 in accordance with a selected program to coincide with the sensing of selected integrators, and by the use of any of the coils 22, 28 or 36, the curve so plotted may be made to represent the relationship between significant quantities generated during the solution of a particular problem. Of course an appreciation of the various plots which can be made will be furthered by considering the operation of digital differential analyzers as more completely described in the above-referenced patent documents.

In addition to being used with the digital differential analyzer shown in block form in Figure 3, the graph plotter disclosed above can be easily adapted for use with the analyzer disclosed and claimed in co-pending application Serial No. 263,152 filed December 27, 1951, by Glenn E. Hagen et al., and now Patent No. 2,850,232.

Although this invention has been disclosed and illustrated with reference to particular applications, the principles involved are susceptible of numerous other applications which will be apparent to persons skilled in the art. The invention, is, therefore, to be limited only as indicated by the scope of the appended claims.

What is claimed is:

1. In combination, means for digitally indicating an independent quantity for each of a plurality of integrators, means for digitally indicating a dependent quantity for each of a plurality of integrators, means for digitally varying the independent quantity for each integrator in sequence, means for differentially combining the independent and dependent quantities for each integrator upon each digital variation in the independent quantity for the integrator, means for digitally indicating for each integrator the output quantity represented by the differential combinaiton performed in the integrator, plotting means having first and second co-ordinates for plotting along one co-ordinate the digital indications of one of the quantities represented in a first integrator, and means for plotting along a second co-ordinate intersecting the first co-ordinate the digital indications of one of the quantities represented in a second integrator.

2. In combination, means for providing digital indications of an independent quantity for each of a plurality of integrators, means for providing digital indications of a dependent quantity for each of a plurality of integrators, means for making the digital indications of the independent quantity for each integrator available in sequence, means for differentially combining the digital indications of the independent and dependent quantities for each integrator to produce an output quantity for the integrator every time that the integrator is made available for computation, means for providing digital indications of the output quantity for each integrator, means for providing a record of the digital indications of one of the quantities represented by digital indications in a first integrator every time that the integrator is made available for computation, means for providing a record of the digital indications of one of the quantities represented by digital indications in a second integrator every time that the integrator is made available for computation, and means for plotting a curve having the recorded quantity of the first integrator as ordinate and the recorded quantity of the second integrator as abscissa.

3. In combination, means for providing digital indications of an independent quantity for each of a plurality of integrators, means for providing digital indications of a dependent quantity for each of the integrators, means for sequentially making each of the integrators available for computation, means for differentially combining the digital indications of the dependent and independent quantities for each integrator to produce an output quantity for the integrator every time that it is made available for computation, means for providing digital indications of the output quantity for each integrator, means for providing digital indications of an overflow of the output quantity for each integrator, a graph plotter, means for actuating the graph plotter along a first axis upon a predetermined count of the overflow indications from a first integrator in the plurality, and means for actuating the graph plotter along a second axis intersecting the first axis upon a predetermined count of the overflow indications from a second integrator in the plurality.

4. In combination, means for providing finite indications of an independent quantity for each of a plurality of integrators, means for providing finite indications of a dependent quantity for each integrator, means for digitally varying the independent quantity for each integrator on a sequential basis, means for differentially combining the finite indications of the independent and dependent quantities for each integrator upon each digital variation in the independent quantity for the integrator, means for providing finite indications of the differential combination for each integrator, means for combining the finite indications of the dependent quantity for each integrator and the differential combinations for certain other integrators upon each digital variation in the independent quantity for the integrator and in accordance with a digitally coded pattern dependent upon the problem to be solved so as to produce a new dependent quantity for the integrator, a graph plotter adapted to provide indications along a pair of intersecting co-ordinates, means for providing an indication along one of the co-ordinates of the graph plotter in accordance with the finite variations of one of the quantities represented by digital indications in a first integrator in the plurality, and means for providing an indication along the other co-ordinate of the graph plotter in accordance with the finite variations of one of the quantities represented by digital indications a second integrator in the plurality.

5. In combination, means for providing digital indications of an independent quantity for each of a plurality of integrators, means for providing digital indications of a dependent quantity for each integrator, means for digitally varying the independent quantity for each integrator in sequence, means for differentially combining the digital indications of the dependent and independent quantities for each integrator upon each digital variation in the independent quantity for the integrator, means for providing digital indications of the differential combination for each integrator, means for providing a digital indication of any overflow in the digital indications of the differential combination for each integrator, means for combining the digital indications of the dependent quantity for each integrator with the overflow indications from other integrators in a pattern dependent upon the problem to be solved and upon each digital variation in the independent quantity for the integrator so as to produce new indications of the dependent quantity for the integrator, means for providing a predetermined count of overflow indications for a first integrator in the plurality, a first magnetic solenoid, means for energizing the first solenoid upon each integral multiple of the predetermined count, a graph plotter, means for providing an indication on the graph plotter of the change in the count of overflow indications for the first integrator upon each energization of the first magnetic solenoid, means for providing a predetermined count of overflow indications for a second integrator in the plurality, a second magnetic solenoid, and means for providing an indication on the graph plotter of the change in the count of overflow indications for the second integrator upon each energization of the second magnetic solenoid.

6. In combination, a graph plotter, first magnetomotive means operative to change the indication of the graph plotter by a finite increment along a first axis, second magnetomotive means operative to change the indication of the graph plotter by a finite increment along a second axis intersecting the first axis, means for providing an independent quantity for each of a plurality of integrators, means for providing a dependent quantity for each of the integrators, means for digitally varying the independent quantity for each integrator in sequence, means for differentially combining the independent and dependent quantities for each integrator upon each digital variation in the independent quantity for the integrator, means for storing in finite form the differential combination for each integrator, means for providing finite indications of any overflow in the storage of the differential combination for each integrator, means for actuating the first magnetomotive means upon a predetermined count of overflow indications in a first integrator in the plurality, and means for actuating the second magnetomotive means upon a predetermined count of overflow indications in a second integrator in the plurality.

7. In combination, means for providing an independent quantity for each of a plurality of integrators, means for digitally varying the independent quantity for each integrator in sequence, means for providing a dependent quantity for each integrator, means for differentially combining the independent and dependent quantities for each integrator upon each digital variation in the independent quantity for the integrator, means for providing for the storage of the differential combinations for each integrator, means for providing an indication of any overflow in the storage of the value of the differential combination for each integrator, means for arithmetically counting the positive and negative overflow indications for a first integrator in the plurality to provide an indication of the resultant count, a graph plotter, means for providing an indication along a first axis on the graph plotter upon each integral multiple of the resultant count for the overflow indications for the first integrator and in accordance with the sign of the resultant count, means for arithmetically counting the positive and negative overflow indications for a second integrator in the plurality to provide an indication of the resultant count, and means for providing an indication along a second axis on the graph plotter substantially perpendicular to the first axis upon each integral multiple of the resultant count for the overflow indications for the second integrator and in accordance with the sign of the resultant count.

8. In combination, means for providing an independent quantity for each of a plurality of integrators, means for digitally varying the independent quantity for each integrator in sequence, means for providing a dependent quantity for each integrator, means for differentially combining the independent and dependent quantities for each integrator upon each digital variation in the independent quantity for the integrator, means for providing for the storage of the differential combination for each integrator, means for providing an indication of any overflow in the storage of the value of the differential combination for each integrator, means for arithmetically counting the positive and negative overflow indications for a first integrator in the plurality to provide an indication of the resultant count, means for providing an indication as to whether the count is positive or negative, a graph plotter, means for providing a change in the position of an indication on the graph plotter along a first axis upon each integral multiple of the resultant count for the overflow indications for the first integrator and in accordance with the indication of sign, means for arithmetically counting the positive and negative overflow indications for a second integrator in the plurality to provide an indication of the resultant count, means for providing an indication as to whether the count in the second integrator is positive or negative, and means for providing a change in the position of an indication on the graph plotter along a second axis substantially perpendicular to the first axis upon each integral multiple of the resultant count for the overflow indications for the second integrator and in accordance with the indication of sign.

9. In combination, means for providing a plurality of integrators, means for sequentially presenting the integrators for computation, electrical circuits for providing signal indications digitally representing variations in an independent quantity for each integrator upon the presentation of the integrator for computation, electrical circuits for providing signal indications digitally representing a dependent quantity for each integrator, electrical circuits for differentially combining the signal indications representing the independent and dependent quantities for each integrator to produce an output quantity for the integrator, electrical circuits for providing signal indications digitally representing the output quantity for each integrator, electrical circuits for receiving the signal indications representing a particular one of the quantities from a first integrator and for providing a graphical representation of the quantity along a first axis, and electrical circuits for receiving the signal indications representing a particular one of the quantities from a second integrator and for providing a graphical representation of the quantity along a second axis intersecting the first axis.

10. In combination, means for providing a plurality of integrators, means for sequentially presenting the integrators for computation, electrical circuits for providing signal indications representing digital variations in an independent quantity for each integrator, electrical circuits for providing signal indications digitally representing a dependent quantity for each integrator, electrical circuits for differentially combining the signal indications representing the dependent quantity and the variations in the independent quantity for each integrator upon the presentation of the integrator for computation, electrical circuits for providing signal indications digitally representing the output quantity for each integrator, electrical circuits for providing signal indications digitally representing any overflow in the signal indications representing the output quantity for each integrator, electrical circuits for determining variations in the dependent and independent quantities for each integrator in accordance with the overflow indications from certain integrators dependent upon the problem to be solved, a stylus for providing a written record of its movement, first magneto-motive means for producing a movement of the stylus in a first direction upon actuation, second magneto-motive means for producing a movement of the stylus in a second direction substantially perpendicular to the first direction upon its actuation, electrical circuits for receiving the signal indications representing one of the quantities in a first integrator and for actuating the first magnetomotive means in accordance with the received signals, and electrical circuits for receiving the signal indications representing one of the quantities in a second integrator and for actuating the second magnetomotive means in accordance with the received signals.

11. In combination, means for providing a plurality of integrators, means for sequentially presenting the integrators for computation, electrical circuits for providing signal indications representing in finite form variations in an independent quantity for each integrator, electrical circuits for providing signal indications representing in finite form a dependent quantity for each integrator, electrical circuits for providing in finite form signal indications representing the differential combination of the dependent quantity and the variations in the independent quantity for each integrator, electrical circuits for providing signal indications representing in finite form any overflow in the signal indications representing the differential combination for each integrator, electrical circuits for determining variations in the dependent quantity for each integrator in accordance with the overflow indications from certain other integrators dependent upon the problem to be solved, electrical circuits for arithmetically combining the signal indications representing the dependent quantity and the variations in the dependent quantity for each integrator to obtain new signal indications representing the dependent quantity for the integrator, a first circuit for counting the signal indications representing one of the quantities in a first integrator and for indicating the polarity of the count, first triggering circuits associated with the first counting circuit to become energized upon each completion of the count in the counting circuit and in accordance with the polarity of the count, magnetomotive means associated with the first triggering circuit to provide an indication in a first direction upon each energization of the triggering circuits, a second circuit for counting the signal indications representing one of the quantities in a second integrator and for indicating the polarity of the count, second triggering circuits associated with the second counting circuit to become energized upon each completion of the count in the counting circuit and in accordance with the polarity of the count, and magnetomotive means associated with the second triggering circuits to provide an indication in a second direction upon each energization of the triggering circuits.

12. In combination, means for providing a plurality of integrators, means for sequentially presenting the integrators for computation, electrical circuits for providing signal indications digitally representing variations in an independent quantity for each integrator, electrical circuits for providing signal indications digitally representing a dependent quantity for each integrator, electrical circuits for providing signal indications digitally representing the differential combination of the dependent and independent quantities for each integrator, a first circuit for counting signal indications representing one of the quantities in a first integrator and for indicating the polarity of the count, a stylus, first means including at least one one-shot multivibrator and one magnetic solenoid associated with the counting circuit for actuating the stylus for movement along a first axis upon a full count in the counting circuit and in accordance with the polarity of the count, a second circuit for counting the signal indications representing one of the quantities in a second integrator and for indicating the polarity of the count, and second means including at least one monostable multivibrator and one magnetic solenoid associated with the second counting circuit for actuating the stylus along a second axis substantially perpendicular to the first axis upon a full count in the second counting circuit and in accordance with the polarity of the count.

13. In combination, means for providing a plurality of integrators, means for sequentially presenting the integrators for computation, electrical circuits for providing signal indications digitally representing variations in an independent quantity for each integrator, electrical circuits for providing signal indications digitally representing a dependent quantity for each integrator, electrical circuits for providing signal indications digitally representing the differential combination of the dependent and independent quantities for each integrator, electrical circuits for providing signal indications digitally representing any overflow in the signal indications representing the differential combination for each integrator, electrical circuits for determining variations in the independent and dependent quantities for each integrator in accordance with the overflow indications from certain integrators dependent upon the problem to be solved, a first circuit for counting the signal indications representing one of the quantities in a first integrator and for determining the polarity of the count, means including a first triggering circuit and a first solenoid associated with the counting circuit for providing an indication in a first direction upon a full count of a first polarity in the first counting circuit, means including a second triggering circuit and a second solenoid for providing an indication in a direction opposite to the first direction upon a full count of the opposite polarity in the first counting circuit, a second circuit for counting the signal indications representing one of the quantities in a second integrator and for determining the polarity of the count, means including a third triggering circuit and a third solenoid for providing an indication in a second direction substantially perpendicular to the first direction upon a full count of the first polarity in the second counting circuit, and means including a fourth triggering circuit and a fourth solenoid for providing an indication in a direction opposite to the second direction upon a full count of the opposite polarity in the second counting circuit.

14. In combination, means for providing a plurality of integrators, means for sequentially presenting the integrators for computation, electrical circuits for providing signal indications representing in finite form variations in an independent quantity for each integrator, electrical circuits for providing signal indications representing in finite form a dependent quantity for each integrator, electrical circuits for providing signal indications representing in finite form the differential combination of the independent and dependent quantities for each integrator, a graph plotter, means including a first triggering circuit and a first magnetic coil for providing indications of increasing value along a first axis of the graph plotter, means including a second triggering circuit and a second magnetic coil for providing indications of decreasing value along the first axis of the graph plotter, means including a third triggering circuit and a third magnetic coil for providing indications of increasing value on the graph plotter along a second axis intersecting the first axis, means including a fourth triggering circuit and a fourth magnetic coil for providing indications of decreasing value along the second axis of the graph plotter, a first electrical circuit for controlling the operation of the first and second triggering circuits and the first and second magnetic coils in accordance with the polarity of the signal indications representing one of the quantities from a first integrator, and a second electrical circuit for controlling the operation of the third and fourth triggering circuits and the third and fourth magnetic coils in accordance with the polarity of the signal indications representing one of the quantities from a second integrator.

References Cited in the file of this patent

UNITED STATES PATENTS 2,704,633     Strother _____ Mar. 22, 1955

OTHER REFERENCES

A New Type of Differential Analyzer: V. Bush et al., "Journal of the Franklin Institute," volume 240, No. 4, October 1945; pages 255–325.